C. I. DECKER.
TONNEAU WINDSHIELD.
APPLICATION FILED JULY 7, 1921.
1,421,181.
Patented June 27, 1922.
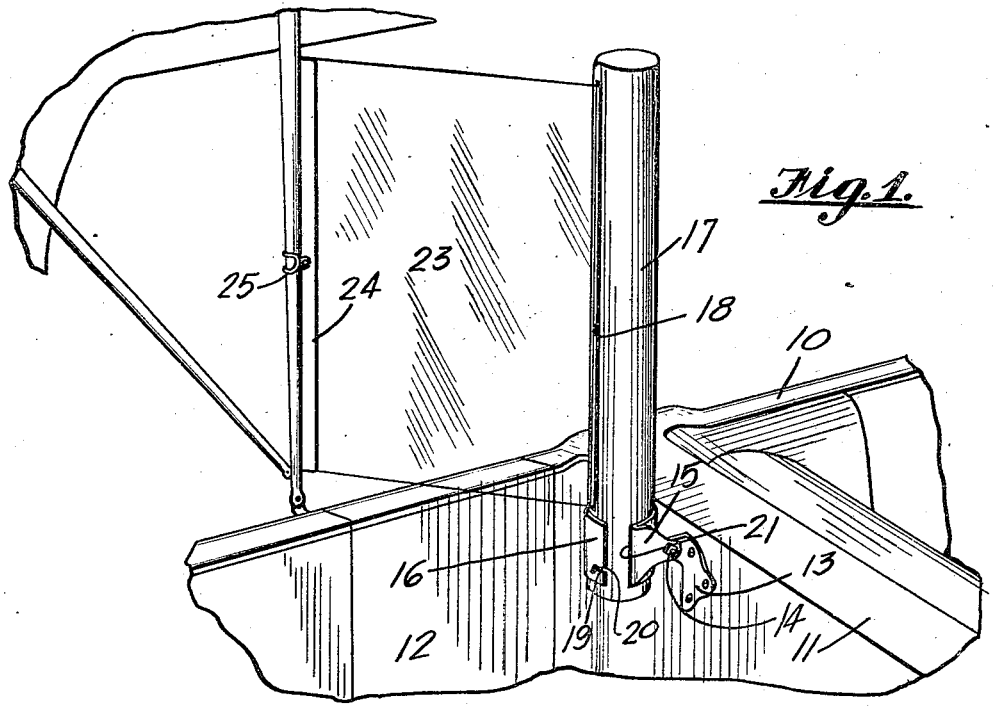
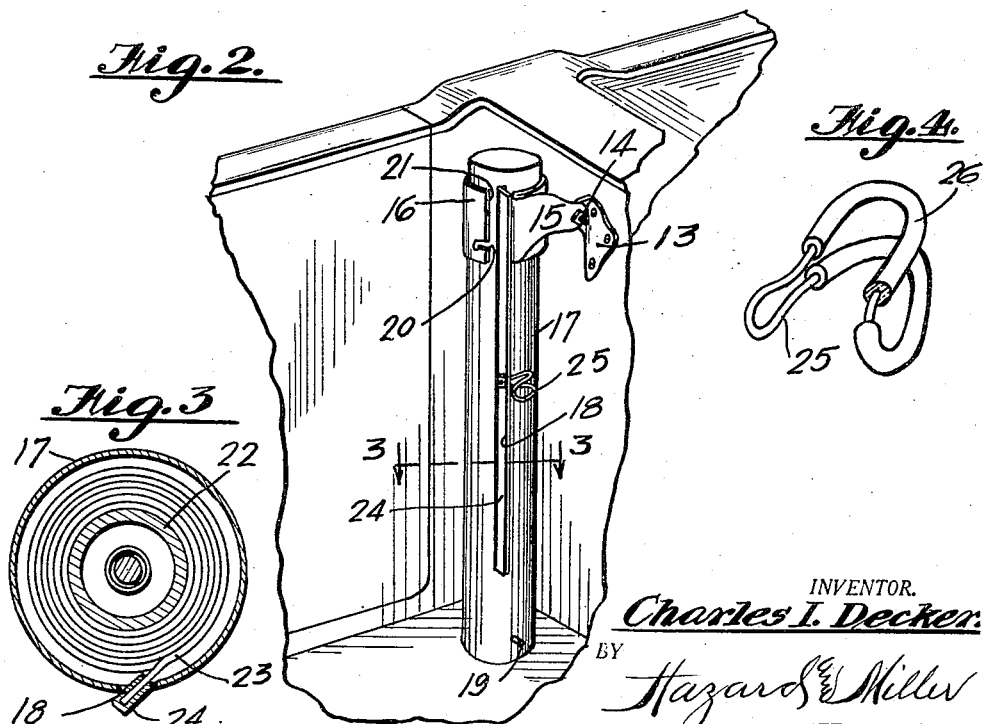
INVENTOR.
Charles I. Decker.
BY
Hazard & Miller
ATTORNEYS.

UNITED STATES PATENT OFFICE.

CHARLES I. DECKER, OF SHERMAN, CALIFORNIA.

TONNEAU WINDSHIELD.

1,421,181.	Specification of Letters Patent.	Patented June 27, 1922.

Application filed July 7, 1921. Serial No. 482,958.

*To all whom it may concern:*

Be it known that I, CHARLES I. DECKER, a citizen of the United States, residing at Sherman, in the county of Los Angeles and State of California, have invented new and useful Improvements in Tonneau Windshields, of which the following is a specification.

My invention relates generally to motor vehicles of the passenger type, and more particularly to a windshield that is adapted to be positioned in the tonneau of the vehicle to the rear of the front seat thereof, the principal objects of my invention being to generally improve upon and simplify the construction of the existing types of tonneau windshields and to provide a windshield that may be easily and quickly positioned for use; to provide a suitable holder or housing for the shield member and to mount said housing or holder so that when the shield member is positioned therein the entire structure may be readily shifted into an out-of-the-way position behind the end portion of the front seat.

A further object of my invention is to provide an improved form of windshield wherein the shield member is constructed wholly of flexible transparent material, such as thin sheet celluloid or the like, and which provision enables the shield member to be rolled up so as to occupy but little space while not in use.

With the foregoing and other objects in view my invention consists in certain novel features of construction and arrangement of parts that will be hereinafter more fully described and claimed, and illustrated in the accompanying drawings, in which Figure 1 is a perspective view of a portion of the body of a motor vehicle and showing my improved windshield in position thereupon.

Fig. 2 is a perspective view similar to Fig. 1 and showing my improved windshield in its out-of-service position behind the end portion of the front seat of the vehicle.

Fig. 3 is an enlarged horizontal section taken approximately on the line 3—3 of Fig. 2.

Fig. 4 is a perspective view of a hook that is utilized for connecting the shield member to a part of the vehicle top supporting frame.

Referring by numerals to the accompanying drawings, which illustrate a practical embodiment of my invention, 10 designates the side wall of the vehicle body, 11 the back structure of the front seat, and 12 one of the rear doors. Secured in any suitable manner to the front seat back 11 adjacent to its end is a plate 13 to which is connected by a set screw or bolt and nut, such as 14, one end of a short arm 15, and secured to said arm is a short, vertically disposed cylinder 16 that serves as a bearing and support for the housing of my improved shield. This housing comprises a tubular member 17 closed at both ends and provided in its side wall with a longitudinally disposed slot 18, and projecting laterally from the lower portion of the cylindrical housing is a pin or stud 19 which, when the cylindrical housing is elevated, engages in a bayonet slot 20, and which latter extends inwardly from a vertically disposed slot 21 that is formed in the supporting member 16.

Journaled in suitable bearings that are arranged in the ends of the cylindrical housing 17 are the ends of an ordinary spring actuated roller 22, preferably of the Hartshorne type, and secured thereto is the inner end of a substantially rectangular section 23 of flexible transparent material, such as sheet celluloid. The outer edge of this transparent flexible section is provided with a suitable binding strip 24 and secured in any suitable manner to the inturned portion thereof is a hook 25, preferably formed of wire, and covered with rubber tubing 26, and said hook being of such size as to engage around one of the upright portions of the vehicle top supporting framework when the shield member is withdrawn from the housing 17.

When out of service the flexible shield member 23 is wound upon the roller 22 within the housing 17 and the latter is moved downwardly through the cylindrical bearing 16 so that it occupies an out-of-the-way position in the corner between the front seat back 11 and side wall structure 10 of the vehicle body, as seen in Fig. 2, and when it is desired to position the shield for use housing 17 is elevated through its bearing 16 and secured thereto in elevated position by the engagement of the pin or stud 19 in the slot 20. The projecting portion of hook 25 is now engaged and the flexible shield member 23 is drawn from housing 17 through slot 18, and to retain the shield member in its withdrawn position said hook is engaged on one of the upright members of the top supporting framework and thus said shield member 23 occupies an angular position between the end of the front seat back 11 and the side 10 of the vehicle body to the rear of said front seat, and as a result, occupants of the rear seat are protected against wind, dust and the like.

By proper manipulation of the set screw or nut 14 the position of the arm 15 with respect to plate or bracket 13 may be readily adjusted, and likewise, the angular position of the housing 17 may be adjusted to the desired position. Upon disengaging the hook 25 from the vehicle top supporting framework the spring associated with roller 22 will act to rewind the flexible shield member upon said roller, and after disengaging the pin or stud 19 from slot 20 the housing and the shield member arranged therein may be lowered into its out-of-the-way position.

Thus it will be seen that I have produced a relatively simple and practical form of tonneau windshield that is capable of being easily and quickly manipulated when shifted into or out of position for use, and the structure of the device being such as to permit it to be easily and cheaply produced.

It will be readily understood that minor changes in the size, form and construction of the various parts of my improved tonneau windshield may be made and substituted for those herein shown and described without departing from the spirit of my invention, the scope of which is set forth in the appended claim.

I claim as my invention:

In a tonneau windshield, an adjustably mounted housing provided with a slot, a spring actuated roller arranged for operation within said housing, a flexible shield member secured to said roller and adapted to wind thereupon and to unwind therefrom through said slot, a slotted bracket slidably receiving said housing, a bayonet slot formed in the bracket and communicating with the slot thereof, and a pin fixed on the housing and adapted to engage within the bayonet slot for retaining the housing in elevated position within the bracket.

In testimony whereof I have signed my name to this specification.

CHARLES I. DECKER.